United States Patent
Liu et al.

(10) Patent No.: US 12,530,758 B2
(45) Date of Patent: Jan. 20, 2026

(54) IMAGE ANALYSIS SYSTEM AND IMAGE ANALYSIS METHOD

(71) Applicant: NEC Corporation, Tokyo (JP)

(72) Inventors: Jianquan Liu, Tokyo (JP); Youhei Sasaki, Tokyo (JP); Yuta Namiki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 366 days.

(21) Appl. No.: 18/026,520

(22) PCT Filed: Sep. 25, 2020

(86) PCT No.: PCT/JP2020/036222
§ 371 (c)(1),
(2) Date: Mar. 15, 2023

(87) PCT Pub. No.: WO2022/064631
PCT Pub. Date: Mar. 31, 2022

(65) Prior Publication Data
US 2023/0351571 A1    Nov. 2, 2023

(51) Int. Cl.
*G06T 7/00* (2017.01)
*G06F 3/0482* (2013.01)

(52) U.S. Cl.
CPC .............. *G06T 7/00* (2013.01); *G06F 3/0482* (2013.01)

(58) Field of Classification Search
CPC ................................ G06T 7/00; G06F 3/0482
USPC ......................................................... 382/100
See application file for complete search history.

(56) References Cited

U.S. PATENT DOCUMENTS

| | | | |
|---|---|---|---|
| 11,381,774 B2* | 7/2022 | Kühm | H01J 37/26 |
| 11,893,296 B1* | 2/2024 | Chen | G06F 3/0482 |
| 2013/0287283 A1 | 10/2013 | Kamath et al. | |
| 2015/0356129 A1 | 12/2015 | Liu | |
| 2016/0239718 A1 | 8/2016 | Korenwaitz et al. | |
| 2017/0032187 A1* | 2/2017 | Saito | G06V 20/30 |
| 2017/0063912 A1* | 3/2017 | Muddu | G06F 3/0482 |
| 2017/0153809 A1* | 6/2017 | Yang | G06F 3/04883 |
| 2017/0185871 A1 | 6/2017 | Zhang et al. | |
| 2018/0088878 A1* | 3/2018 | Endo | G06F 9/44505 |
| 2019/0035106 A1 | 1/2019 | Hirakawa et al. | |
| 2019/0064193 A1 | 2/2019 | Ono | |
| 2019/0180447 A1* | 6/2019 | Komiya | G06T 7/20 |

(Continued)

FOREIGN PATENT DOCUMENTS

| | | |
|---|---|---|
| CN | 111654669 A | 9/2020 |
| JP | 2007-317034 A | 12/2007 |

(Continued)

OTHER PUBLICATIONS

TW Office Action for TW Application No. 110130429, mailed on Jul. 21, 2023 with English Translation.

(Continued)

*Primary Examiner* — William D Titcomb
(74) *Attorney, Agent, or Firm* — Sughrue Mion, PLLC

(57) ABSTRACT

The present invention provides an image analysis system (10) including: a plurality of image analysis units (11); a selection unit (12) that selects at least one of a plurality of the image analysis units (11); an analysis control unit (15) that causes the selected image analysis unit (11) to analyze an image specified by a user; and an output unit (17) that outputs an analysis result of the image.

13 Claims, 17 Drawing Sheets

(56) References Cited

U.S. PATENT DOCUMENTS

| | | | |
|---|---|---|---|
| 2020/0162696 A1* | 5/2020 | Kühm | H04N 5/765 |
| 2021/0158525 A1 | 5/2021 | Iwase et al. | |
| 2022/0283700 A1* | 9/2022 | Wada | G06F 3/0482 |

FOREIGN PATENT DOCUMENTS

| | | |
|---|---|---|
| JP | 2011-243031 A | 12/2011 |
| JP | 2015-049574 A | 3/2015 |
| JP | 2017-191621 A | 10/2017 |
| JP | 2020-093076 A | 6/2020 |
| TW | 201931186 A | 8/2019 |
| WO | 2014/109127 A1 | 7/2014 |
| WO | 2018/061976 A1 | 4/2018 |
| WO | 2019/229789 A1 | 12/2019 |
| WO | 2020/066043 A1 | 4/2020 |

OTHER PUBLICATIONS

International Search Report for PCT Application No. PCT/JP2020/036222, mailed on Dec. 8, 2020.
Extended European Search Report for EP Application No. 20955225.6, dated on Sep. 18, 2023.
JP Office Action for JP Application No. 2024-186475, mailed on Sep. 2, 2025 with English Translation.
SG Office Action for SG Application No. 11202301979W, issued on Oct. 15, 2025 with English Translation.

\* cited by examiner

FIG. 5

| ANALYSIS PURPOSE | IMAGE ANALYSIS METHOD | REPORT FORMAT |
|---|---|---|
| SUSPICIOUS PERSON DETECTION | FACE ANALYSIS, POSE ANALYSIS, ........ | * * * |
| CUSTOMER TREND ANALYSIS | FACE ANALYSIS, · · · · | * * * |
|  |  |  |

FIG. 6

```
SENDER  :analysis-service@··········
ADDRESS:tokyo.taro@··········
SUBJECT : ANALYSIS COMPLETION NOTIFICATION
         (REQUEST ID : R121)
```

ATTACHED FILE :R121.pdf  650kB

NOTIFICATION FROM ANALYSIS SERVICE.

IMAGE ANALYSIS COMPLETED.

ANALYSIS ID:118    REQUEST ID:R121

FOR RESULT, PLEASE REFER TO http://··········,
OR ATTACHED FILE.

FIG. 8

| ANALYSIS ID | REQUEST ID | IMAGE FILE NAME | ANALYSIS METHOD | COMMENT | STATUS | REGIS-TRATION DATE | EXE-CUTION DATE | RESULT |
|---|---|---|---|---|---|---|---|---|
| 118 | R121 | aaa.mpg | FACE ANALYSIS | TEST 3 | COMP-LETION | 2020.7.27 | 2020.7.27 | PDF Web PAGE |

LIST OF ANALYSIS REQUESTS

BACK

FIG. 10

| ANALYSIS RESULT BROWSING HISTORY | | | |
|---|---|---|---|
| ANALYSIS ID | ANALYSIS METHOD | LAST BROWSING DATE | RESULT |
| 118 | FACE ANALYSIS | 2020.7.29 | PDF  Web PAGE |

BACK

IMAGE ANALYSIS SYSTEM AND IMAGE ANALYSIS METHOD

This application is a National Stage Entry of PCT/JP2020/036222 filed on Sep. 25, 2020, the contents of all of which are incorporated herein by reference, in their entirety.

TECHNICAL FIELD

The present invention relates to an image analysis system and an image analysis method.

BACKGROUND ART

Patent Document 1 discloses a technique for analyzing an image and detecting a suspicious person or the like. Patent Documents 2 and 3 disclose an index generation apparatus that an index in which a plurality of nodes are hierarchized is generated.

RELATED DOCUMENT

Patent Document

[Patent Document 1] Japanese Patent Application Publication No. 2017-191621
[Patent Document 2] International Publication No. WO2014/109127
[Patent Document 3] Japanese Patent Application Publication No. 2015-49574

DISCLOSURE OF THE INVENTION

Technical Problem

In an image analysis, there are various types of analysis such as a face analysis for extracting a feature value of a face, a pose analysis for extracting a feature value of a pose of a person, and a vehicle analysis for extracting a feature value of a vehicle. However, when one system is relevant to an image analysis of only one type and the system can merely execute the image analysis of one type, convenience is poor. Any of Patent Documents 1 to 3 does not disclose the problem and a means for solving the problem. An issue according to the present invention is to improve convenience of an image analysis system.

Solution to Problem

According to the present invention, provided is
an image analysis system including:
a plurality of image analysis unit;
a selection unit that selects at least one of a plurality of the image analysis unit;
an analysis control unit that causes the selected image analysis unit to analyze an image specified by a user; and
an output unit that outputs an analysis result of the image.
According to the present invention, provided is
an image analysis method including,
by a computer:
selecting at least one of a plurality of image analysis unit;
causing the selected image analysis unit to analyze an image specified by a user; and
outputting an analysis result of the image.

Advantageous Effects of Invention

According to the present invention, convenience of an image analysis system improves.

BRIEF DESCRIPTION OF THE DRAWINGS

FIG. 5 is a diagram schematically illustrating one example of information processed by the image analysis system according to the present example embodiment.
FIG. 6 is a diagram schematically illustrating one example of information output by the image analysis system according to the present example embodiment.
FIG. 8 is a diagram schematically illustrating one example of information output by the image analysis system according to the present example embodiment.
FIG. 10 is a diagram schematically illustrating one example of information output by the image analysis system according to the present example embodiment.

DESCRIPTION OF EMBODIMENTS

Hereinafter, an example embodiment according to the present invention is described by using the drawings. Note that, in all the drawings, a similar component is assigned with a similar reference sign, and therefore description thereof is omitted, as appropriate.

"Outline"

An image analysis system (hereinafter, referred to as an "image analysis system 10") according to the present example embodiment includes a plurality of image analysis unit for executing image analyses of different types from each other. Then, the image analysis system 10 analyzes an image specified by a user, by using the image analysis unit selected based on user input, and outputs an analysis result. According to the image analysis system 10 configured in this manner, convenience improves.

"Configuration"

Next, a configuration of the image analysis system 10 is described. First, one example of a hardware configuration of the image analysis system 10 is described. Each function unit of the image analysis system 10 is achieved by any combination of hardware and software mainly including a central processing unit (CPU) of any computer, a memory, a program loaded onto a memory, a storage unit (capable of storing, in addition to a program previously stored from a shipment stage of an apparatus, a program downloaded from a storage medium such as a compact disc (CD) or a server or the like on the Internet) such as a hard disk storing the program, and a network connection interface. Then, those of ordinary skill in the art should understand that there are various modified examples for the achievement method and the apparatus.

Figure 1:
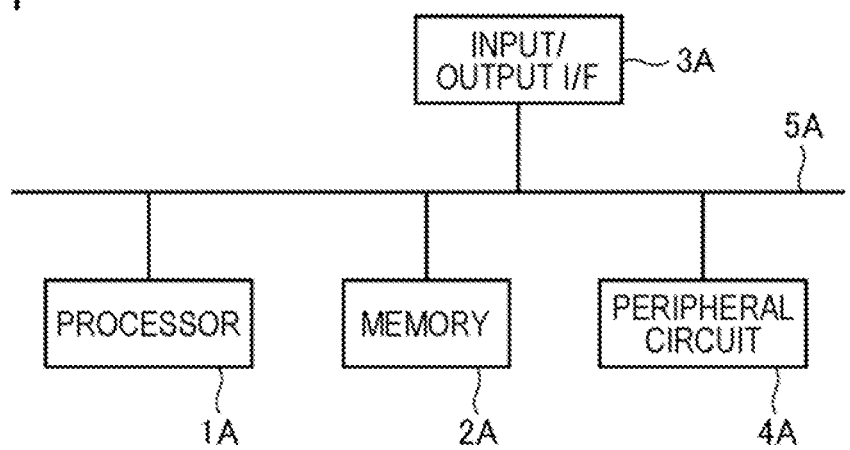
FIG. 1 is a diagram illustrating a hardware configuration example of an image analysis system according to the present example embodiment.

FIG. 1 is a block diagram illustrating a hardware configuration of the image analysis system 10. As illustrated in FIG. 1, the image analysis system 10 includes a processor 1A, a memory 2A, an input/output interface 3A, a peripheral circuit 4A, and a bus 5A. The peripheral circuit 4A includes various modules. The image analysis system 10 does not necessarily include the peripheral circuit 4A. Note that, the image analysis system 10 may be configured by using a plurality of apparatuses separated physically and/or logically, or may be configured by using one apparatus integrated physically and/or logically. When the image analysis system 10 is configured by using a plurality of apparatuses separated physically and/or logically, each of the plurality of apparatuses can include the hardware configuration described above.

The bus 5A is a data transmission path in which the processor 1A, the memory 2A, the peripheral circuit 4A, and the input/output interface 3A mutually transmit/receive data. The processor 1A is an arithmetic processing apparatus, for example, such as a CPU and a graphics processing unit (GPU). The memory 2A is a memory, for example, such as a random access memory (RAM) and a read only memory (ROM). The input/output interface 3A includes an interface for acquiring information from an input apparatus, an external apparatus, an external server, an external sensor, a camera, or the like and an interface for outputting information to an output apparatus, an external apparatus, an external server, or the like, or the like. The input apparatus is, for example, a keyboard, a mouse, a microphone, a physical button, a touch panel, or the like. The output apparatus is, for example, a display, a speaker, a printer, a mailer, or the like. The processor 1A can issue an instruction to each module, and thereby, perform an arithmetic operation, based on an arithmetic operation result of the module.

Figure 2:
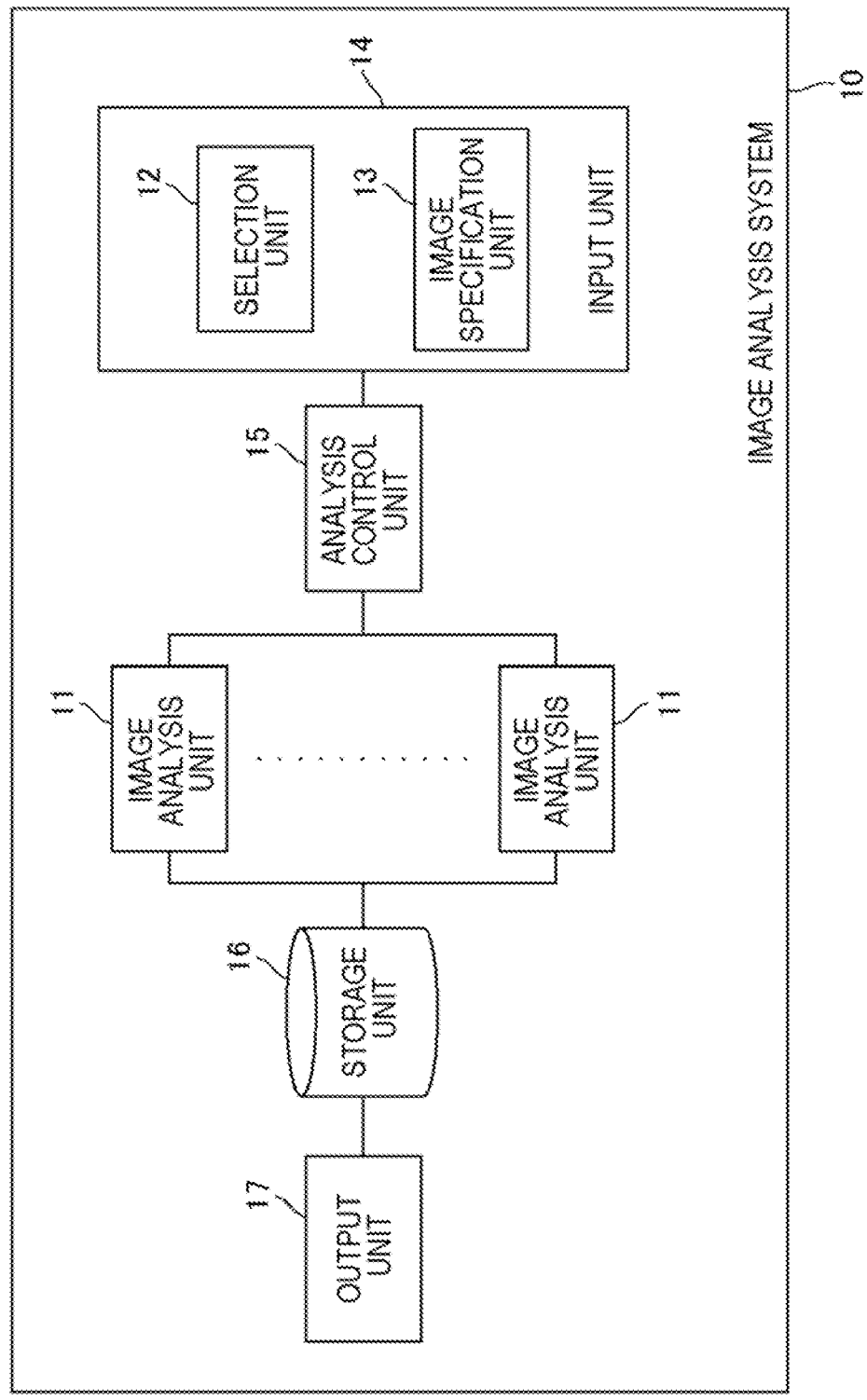
FIG. 2 is one example of a function block diagram of the image analysis system according to the present example embodiment.

Next, a function configuration of the image analysis system 10 is described. FIG. 2 illustrates one example of a function block diagram of the image analysis system 10. As illustrated, the image analysis system 10 includes a plurality of image analysis units 11, an input unit 14, an analysis control unit 15, a storage unit 16, and an output unit 17. Then, the input unit 14 includes a selection unit 12 and an image specification unit 13. Hereinafter, a configuration of each function unit is described in detail.

Each of the image analysis unit 11 analyzes an image. A plurality of image analysis units 11 execute image analyses of different types from each other. The types of image analysis include, for example, face recognition, human somatotype recognition, pose estimation, appearance attribute estimation, gradient feature detection of an image, color feature detection of an image, object recognition, and the like. An image analysis executed by the plurality of image analysis units 11 may be any of the types exemplarily described herein.

In the face recognition, a face feature value of a person is extracted. In addition, similarity between face feature values may be collated/computed (determination of whether to be the same person or the like). In the human somatotype recognition, a human-body feature value (indicating an entire feature such as, for example, being obese or slim of a body shape, body height, or dress) of a person is extracted. Similarity between human-body feature values may be collated/computed (determination of whether to be the same person or the like). In the pose estimation, a joint point of a person is recognized, and a stick figure is configured by connecting the joint points. Then, by using information of the stick figure, a body height of the person is estimated, or a feature value of a pose is extracted. Further, similarity between feature values of poses may be collated/computed (determination of whether to be the same action or the like).

In the appearance attribute estimation, an appearance attribute (e.g., a dress color, a shoe color, a hair style, or wearing of a hat, a necktie, or the like, and there are appearance attributes of, for example, 100 week types or more) associated with a person is recognized. Further, similarity between recognized appearance attributes may be collated/computed (it can be determined whether to be the same attribute). A gradient feature of an image includes SIFT, SURF, RIFF, ORB, BRISK, CARD, and HoG. A color feature of an image is a color histogram or the like. The object recognition is achieved by using an engine, for example, such as YoLo (capable of extracting a general object [e.g., a car, a bicycle, a chair, or the like] or extracting a person).

Note that, the exemplary description described above is merely one example, and another image analysis may be executed. Every conventional technique, for example, such as a vehicle analysis for extracting both feature values is usable. The image analysis unit 11 stores an analysis result in the storage unit 16.

The image analysis unit 11 may store, in the storage unit 16, raw data of an analysis result generated based on the image analysis. The raw data include various types of feature values extracted from each image.

In addition, the image analysis unit 11 may store, in the storage unit 16, an arithmetic operation result acquired by executing, based on raw data, various types of pieces of processing such as aggregation and editing. The image analysis unit 11 may, for example, group a plurality of feature values extracted from a plurality of images (e.g., a plurality of frame images included in a moving image) into feature values similar to each other, and store, in the storage unit 16, information indicating a result of the grouping. Based on the grouping, feature values (a feature value of a face and the like) of the same person extracted from a plurality of images can be grouped, feature values of similar poses extracted from a plurality of images can be grouped, and feature values of the same vehicle type extracted from a plurality of images can be grouped.

Herein, one example of a method of achieving the grouping described above is described. For example, a degree of similarity between a feature value extracted from a certain image and all feature values extracted before the extraction is computed, and thereby feature values in which the degree of similarity is equal to or more than a reference value may be grouped. However, in case of this processing, with an increase in the number of extracted feature values, the number of pairs for computing a degree of similarity becomes enormous, and then, a processing load on a computer increases. Therefore, for example, the following method is employable.

Figure 3:
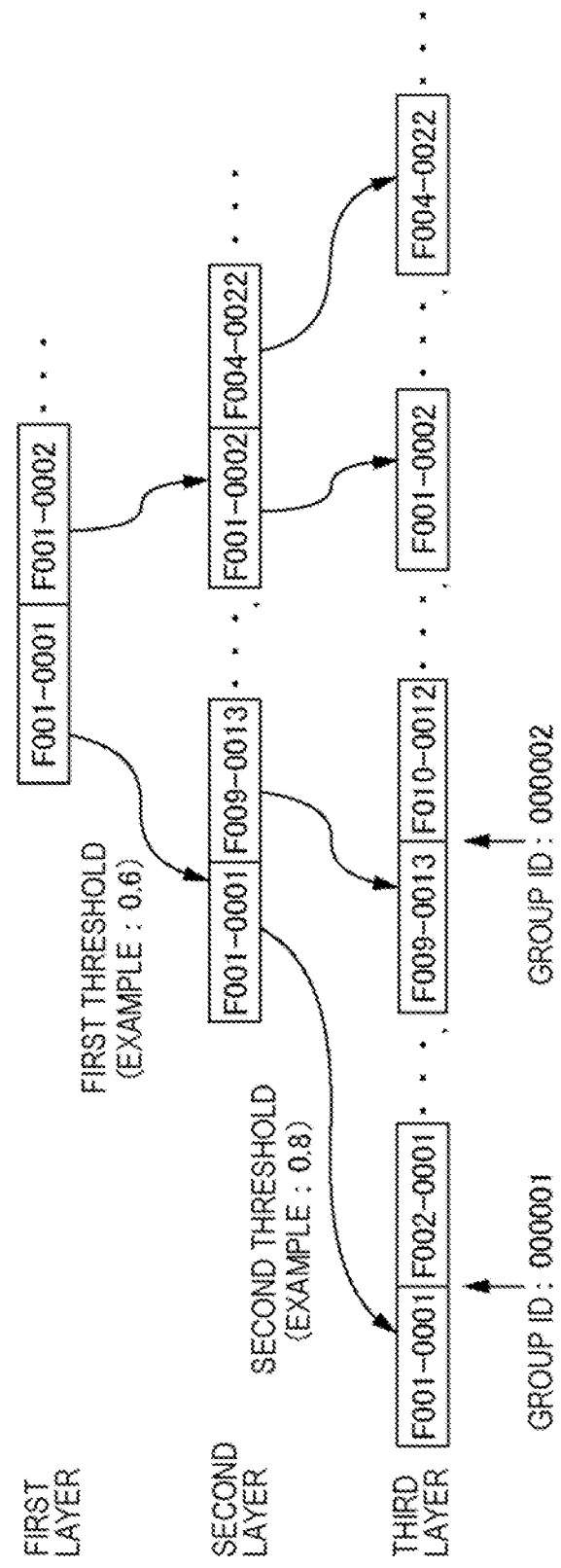
FIG. 3 is a diagram for illustrating one example of processing executed by the image analysis system according to the present example embodiment.

For example, an extracted feature value is indexed as in FIG. 3, and by using the index, the grouping described above may be achieved. When the index is used, a processing speed can be accelerated. Details and a generation method of the index are disclosed in Patent Documents 2 and 3. Hereinafter, a configuration of an index in FIG. 3 and a usage method of the index are briefly described.

An extraction identifier (ID): "F○○○-○○○○" illustrated in FIG. 3 is identification information assigned to each of feature values (a feature value of a face of a person, a feature value of a pose, a feature value of a vehicle, and the like) extracted from each image. The F○○○ is identification information of an image, and a following of a hyphen is identification information of each of feature values extracted from each image.

In a third layer, a node relevant to each of all extraction IDs acquired from images having been processed so far is disposed. Then, a plurality of nodes disposed in the third layer are grouped by aggregating feature values in which a degree of similarity of a feature value is at a first level or higher. A group ID is assigned relevantly to each group in the third layer. A result of grouping of the third layer is a result of final grouping.

In a second layer, one node (representative) selected from each of a plurality of groups in the third layer is disposed, and is associated with the group in the third layer. A plurality of nodes disposed in the second layer are grouped by aggregating feature values in which a degree of similarity is at a second level or higher. Note that, the second level of the degree of similarity is lower than the first level described above. In other words, nodes which are not grouped when the first level is set as a reference may be grouped when the second level is set as the reference.

In a first layer, one node (representative) selected from each of a plurality of groups in the second layer is disposed, and is associated with the group in the second layer.

The image analysis unit 11 indexes, for example, as illustrated in FIG. 3, a plurality of acquired extraction IDs, and adds, when a new extraction ID is acquired, a node of the new extraction ID into the index. Hereinafter, a processing example of addition is described.

First, the image analysis unit 11 sets, as a comparison target, a plurality of extraction IDs located in the first layer. The image analysis unit 11 generates a pair between a new extraction ID and each of a plurality of extraction IDs located in the first layer, and computes a degree of similarity between feature values with respect to each pair. Then, the image analysis unit 11 determines whether the computed degree of similarity is equal to or more than a first threshold value.

When, in the first layer, an extraction ID in which the degree of similarity is equal to or more than the first threshold value is not present, the image analysis unit 11 adds nodes relevant to the new extraction ID into the first to third layers, and associates the nodes with each other. In the second layer and the third layer, a new group is generated by the added node of the new extraction ID. Then, a new group ID is issued relevantly to the new group in the third layer.

On the other hand, when, in the first layer, an extraction ID in which the degree of similarity is equal to or more than the first threshold value is present, the image analysis unit 11 transfers the comparison target to the second layer. Specifically, the image analysis unit 11 sets, as a comparison target, a group in the second layer associated with "an extraction ID of the first layer in which the degree of similarity is determined as being equal to or more than the first threshold value.

Then, the image analysis unit 11 generates a pair between the new extraction ID and each of a plurality of extraction IDs included in a group to be processed in the second layer, and computes the degree of similarity between feature values with respect to each pair. Then, the image analysis unit 11 determines whether the computed degree of similarity is equal to or more than a second threshold value. Note that, the second threshold value is higher than the first threshold value.

When, in the group to be processed in the second layer, an extraction ID in which the degree of similarity is equal to or more than the second threshold value is not present, the image analysis unit 11 adds a node relevant to the new extraction ID into the group to be processed in the second layer, and also adds a node relevant to the new extraction ID into the third layer, and associates the nodes with each other. In the third layer, a new group is generated by the added node of the new extraction ID. The, a new group ID is issued relevantly to the new group in the third layer.

On the other hand, when, in the group to be processed in the second layer, an extraction ID in which the degree of similarity is equal to or more than the second threshold value is present, the image analysis unit 11 adds a node relevant to the new extraction ID to the group of the third layer to which the extraction ID in which the degree of similarity is equal to or more than the second threshold value belongs. A configuration of an index in FIG. 3 and a usage method of the index are as described above.

Note that, the image analysis system 10 may be configured in such a way as to be capable of increasing the number of image analysis units 11 by installing a plug-in. By making a configuration in this manner, based on relatively-simple processing being installation of a plug-in, the number of types of the image analysis executable by the image analysis system 10 can be increased. With an increase in the number of types of the image analysis executable by the image analysis system 10, convenience improves.

Figure 4:
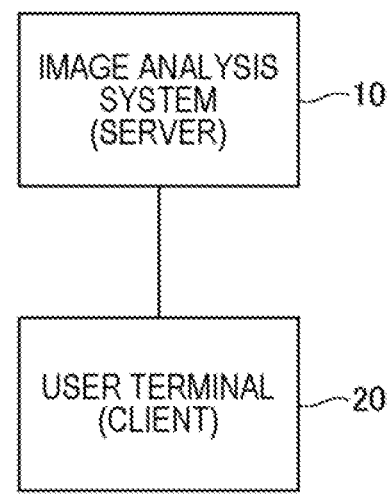
FIG. 4 is a configuration example of the image analysis system according to the present example embodiment.

Referring back to FIG. 2, the input unit 14 accepts user input. The user input may be achieved via an input apparatus such as a touch panel, a keyboard, a mouse, a physical button, and a microphone connected to the image analysis system 10. In addition, the image analysis system 10 may be a server of a client-server system as illustrated in FIG. 4. In this case, user input is achieved via a user terminal 20 (a client) communicably connected to the image analysis system 10 via a communication network. The user terminal 20 includes, but not limited to, for example, a personal computer, a smartphone, a tablet terminal, a smartwatch, a mobile phone, and the like.

The selection unit 12 selects at least one of a plurality of image analysis units 11. The selection unit 12 may, for example, selectably provide a plurality of types of the image analyses such as a "face analysis", a "pose analysis", and a "vehicle analysis" relevant to each of the plurality of image analysis units 11, and accept user input for selecting at least one of the plurality of types of the image analyses. Then, the selection unit 12 may select an image analysis unit 11 relevant to the image analysis selected by a user.

In addition, as illustrated in FIG. 5, association information in which an analysis purpose and at least one type of image analysis (at least one image analysis unit 11) to be executed at a time of each analysis purpose are associated with each other may be previously generated, and stored in the image analysis system 10. Then, the selection unit 12 may refer to the association information, and select the image analysis unit 11 associated with the analysis purpose selected by a user. The analysis purpose includes, but not limited to, for example, "suspicious person detection", a "customer trend analysis", a "vehicle trend analysis", and the like. Note that, a "report format" illustrated in FIG. 5 is described later.

The image specification unit 13 specifies, based on a user operation, an image to be subjected to the image analysis. The specified image may be a moving image, or may be a still image. The user operation may be an operation for specifying any one of images stored in a storage apparatus accessible by the image analysis system 10, may be an operation for inputting a new image to the image analysis system 10, or may be another operation.

Note that, the input unit 14 can accept various other types of input relating to the image analysis. The various other types of input include, but not limited to, for example, input of a comment to be attached to the image analysis, input of related information (an image-capture date and time, an image-capture location, and the like) of a specified image, input (specification by an elapsed time from the start, or the like) for specifying a part to be analyzed of a specified moving image, or the like.

The analysis control unit 15 causes at least one image analysis unit 11 selected by the selection unit 12 to analyze an image specified by a user.

Referring back to FIG. 2, the output unit 17 outputs an analysis result of an image based on the image analysis unit 11.

As one example, the output unit 17 can output an analysis report generated based on an analysis result of an image. The analysis report can include at least one of a plurality of items described below.

A list of feature values extracted from a specified image.

A result of grouping feature values extracted from a specified image. For example, the number of groups or related information (a representative feature value, a representative image, or the like) of each group may be displayed.

An analysis result (the number of appearances, a temporal change of the number of appearances, or the like) with respect to each group.

Note that, a format of the analysis report may be previously defined. For example, a type (e.g., any one of the types exemplarily described above) of information displayed in the analysis report, a manner (a type of a graph, a format of a graph, or the like) of display, a layout of these pieces of information in the analysis report, a size of a character, a format of a character, a size of an image, or the like may be defined. Then, the output unit 17 may generate and output the analysis report as defined above.

Moreover, as illustrated in FIG. 5, for each analysis purpose, a format of the analysis report may be defined. As describe above, the analysis purpose includes, but not limited to, for example, "suspicious person detection", a "customer trend analysis", a "vehicle trend analysis", and the like. Then, the output unit 17 may generate and output the analysis report, as defined above, relevant to the analysis purpose selected by a user.

Note that, the above-described definition of a format of the analysis report may be customized (modification of an existing definition, addition of a new definition, deletion of an existing definition, or the like) by a user. The output unit 17 may add/modify, based on user input, a format of the analysis report.

Moreover, a user may add, modify, or delete a combination of the "analysis purpose", the "image analysis method", and the "report format" illustrated in FIG. 5. In other words, the image analysis system 10 may update, based on user input, the information illustrated in FIG. 5.

Moreover, the output unit 17 may output raw data generated based on analysis of an image by the image analysis unit 11. The output unit 17 may export or download raw data, or transfer raw data to another storage apparatus.

Moreover, the output unit 17 may include a means for notifying, when analysis of an image based on the image analysis unit 11 having been started according to a user operation is terminated, a user of this matter. For example, as illustrated in FIG. 6, analysis termination may be notified based on an E mail, by using, as an address, a mail address of a user previously registered. The E mail may be attached with the analysis report, or may include a URL of the analysis report disclosed on the web. Note that, instead of/in addition to a notification based on an E mail, another means such as a push notification of an application is usable.

Figure 7:
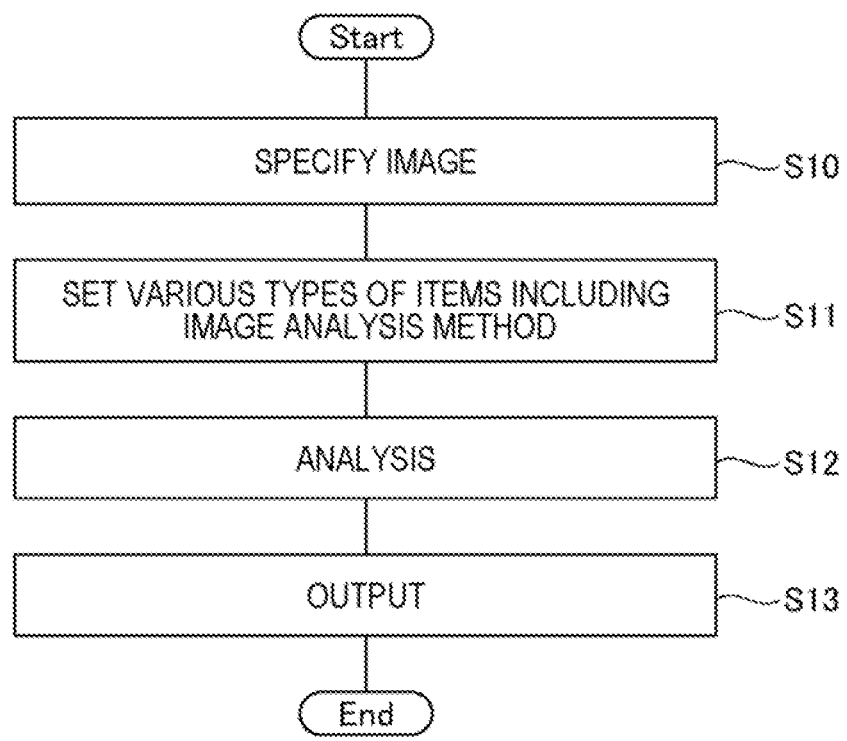
FIG. 7 is a flowchart illustrating one example of a flow of processing of the image analysis system according to the present example embodiment.

Next, by using a flowchart in FIG. 7, one example of a flow of processing of the image analysis system 10 is described.

First, the image specification unit 13 specifies, based on a user operation, an image to be subjected to an image analysis (S10). The user operation may be an operation for specifying any one of images stored in a storage apparatus accessible by the image analysis system 10, may be an operation for inputting a new image to the image analysis system 10, or may be another operation.

Next, the input unit 14 sets, based on a user operation, various types of items including an image analysis method (S11). Setting for the image analysis method indicates selection of an image analysis unit 11.

The selection unit 12 of the input unit 14 may selectably provide, for example, a plurality of types of image analyses (a plurality of types of image analysis units 11) executable by the image analysis system 10 such as a "face analysis", a "pose analysis", and a "vehicle analysis", and accept user input for selecting at least one of the plurality of types of image analyses.

In addition, as illustrated in FIG. 5, association information in which an analysis purpose and at least one type of image analysis (at least one image analysis unit 11) to be executed at a time of each analysis purpose are associated with each other may be previously generated, and stored in the image analysis system 10. Then, the selection unit 12 may refer to the association information, and select the image analysis unit 11 associated with the analysis purpose selected by a user.

Moreover, the input unit 14 may accept input of a comment to be attached to the image analysis, input of related information (an image-capture date and time, an image-capture location, and the like) of a specified image, input (specification by an elapsed time from the start, or the like) for specifying a part to be analyzed of a specified moving image), or the like.

Note that, a processing order of S10 and S11 is not limited to the illustrated processing order.

Next, the analysis control unit 15 causes the selected image analysis unit 11 to analyze the specified image (S12). Thereafter, the output unit 17 outputs an analysis result of the image (S13).

Next, one example of a user interface (UI) screen output by the output unit 17 is described.

FIG. 8 is a list of requests for an image analysis. A user logs in to the image analysis system 10 and thereafter, can call a UI screen indicating a list of requests for the image analysis executed by the user him/herself.

In the illustrated list of requests for the image analysis, an analysis identifier (ID), a request ID, an image file name, an analysis method, a comment, a status, a registration date, an execution date, and a result are associated with one another. Note that, some of these items may not 30 necessarily be included, or another item may be included.

The analysis ID is information identifying the analysis from another analysis.

The request ID is information identifying a request for the analysis from another request.

The image file name is a file name of an image specified by the analysis.

The analysis method is an analysis method selected in the analysis.

The comment is a comment register by a user in association with the analysis.

The status indicates a state of current analysis. A state value of, for example, completion, incompletion, an error, or the like is set.

The registration date is a date on which a request for the analysis is registered.

The execution data is a date on which the analysis is executed.

The result includes a link to an analysis result. When an illustrated a "PDF" is selected, a PDF file indicating an analysis report is opened. When a "web page" is opened, a web page indicating an analysis report is opened Note that, an administrator of the image analysis system 10 also may call, after logging in to the image analysis system 10, a UI screen indicating a list of requests for an image analysis as illustrated in FIG. 8. While, on a UI screen for each user, a list of requests for an image analysis made by each user is displayed, on a UI screen for the administrator, a list of requests for all image analyses made by all users is displayed.

Figure 9:
FIG. 9 is a diagram schematically illustrating one example of information output by the image analysis system according to the present example embodiment.

FIG. 9 illustrates a list of images stored in a storage apparatus accessible by the image analysis system 10. A user can store an image in the storage apparatus, by using any means such as uploading or input of an image. A user can call, after logging in to the image analysis system 10, a UI screen indicating a list of images stored in the storage apparatus by the user him/herself.

In the illustrated list of image files, a file ID, a thumbnail image, an image file name, an image-capture date and time, a reproduction time, a registration date, a file size, an analysis history, and a button for new analysis are associated with one another. Note that, some of these items may not necessarily be included, or another item may be included.

The file ID is information identifying the image from another image.

The thumbnail is a thumbnail image of the image.

The image file name is a file name of the image.

The image-capture date and time is an image-capture date and time of the image.

The reproduction time is a reproduction time of the image (moving image).

The registration date is a date on which the image is stored in the storage apparatus.

The file size is a file size of the image.

The analysis history is a history of an analysis method executed for the image.

When the new analysis button is operated, a UI screen for requesting new analysis for the image is called. When a predetermined operation is performed via the UI screen, new analysis for the image can be executed.

Note that, an administrator of the image analysis system 10 also may call, after logging in to the image analysis system 10, a UI screen indicating a list of image files as illustrated in FIG. 9. While, on a UI screen for each user, a list of images stored in the storage apparatus by each user is displayed, on a UI screen for the administrator, a list of all images stored in the storage apparatus by all users is displayed.

FIG. 10 is a browsing history of an analysis result. A user can browse an analysis result, for example, from the UI screen or the like illustrated in FIG. 8 or FIG. 10. A history of the browsing can be confirmed on the UI screen. A user logs in to the image analysis system 10 and thereafter, can call a UI screen indicating a his/her own browsing history.

In the illustrated analysis result browsing history, an analysis ID, an analysis method, a last browsing date, and a result are associated with one another. Note that, some of these items may not necessarily be included, or another item may be included.

The analysis ID is information identifying the analysis from another analysis.

The analysis method is an analysis method selected in the analysis.

The last browsing date is a date on which the result is browsed last.

The result includes a link to an analysis result. When an illustrated a "PDF" is selected, a PDF file indicating an analysis report is opened. When a "web page" is opened, a web page indicating an analysis report is opened.

Note that, an administrator of the image analysis system 10 also may call, after logging in to the image analysis system 10, a UI screen indicating a browsing history of an analysis result as illustrated in FIG. 10. While, on a UI screen for each user, a browsing history of each user is displayed, on a UI screen for the administrator, a browsing history of all users is displayed.

Figure 11:
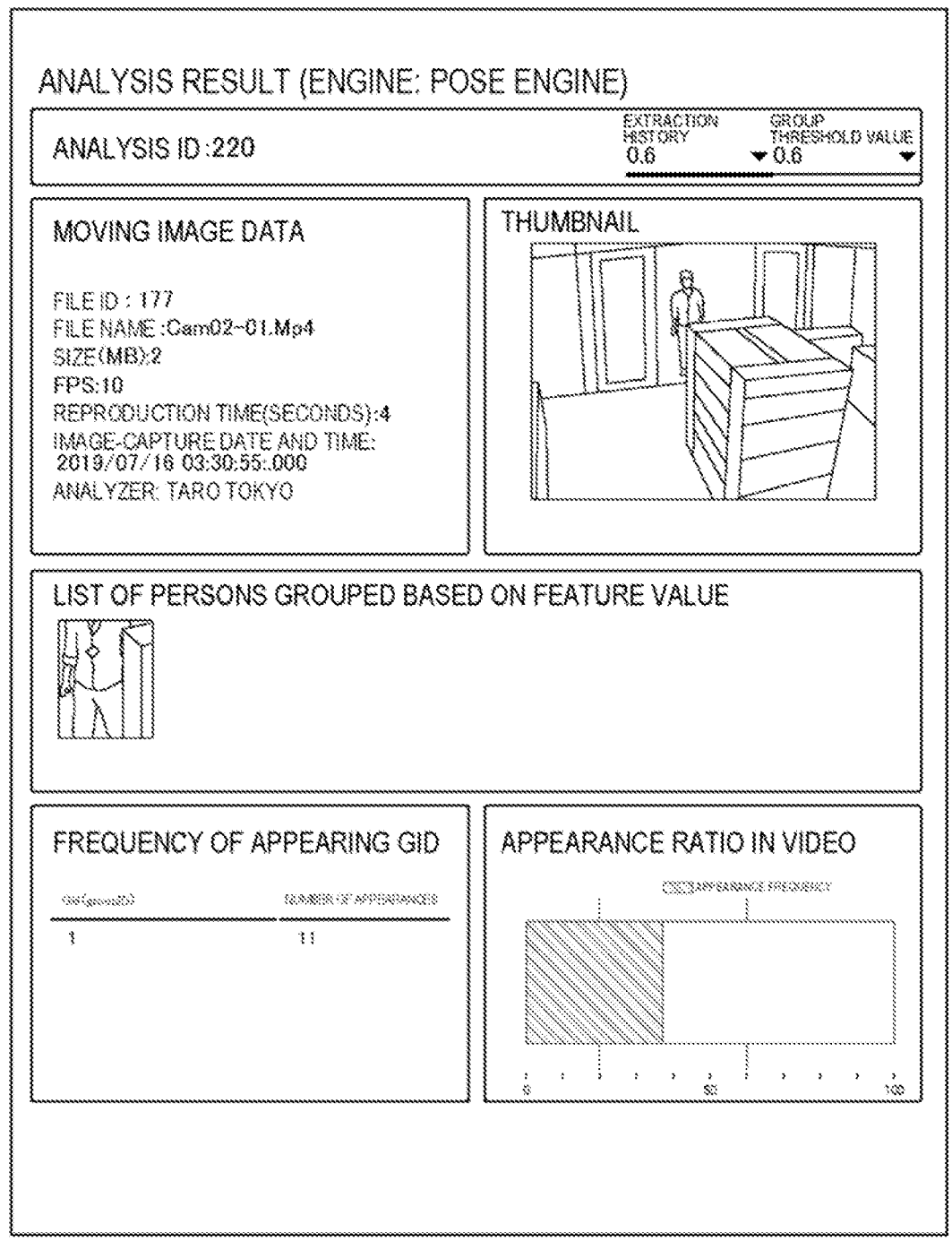
FIG. 11 is a diagram schematically illustrating one example of information output by the image analysis system according to the present example embodiment.

FIG. 11 illustrates one example of an analysis result provided by a PDF file.

In a column of "moving image data", detailed information of an analyzed image is illustrated.

In a column of a "thumbnail", a thumbnail image of the analyzed image is illustrated.

In a column of a "list of persons grouped based on a feature value", a result of grouping feature values extracted from the analyzed image is indicated.

In a column of a "frequency of an appearing GID", the number of appearances of a feature value of each group in the analyzed image is indicated. For example, a moving image is divided into a plurality of windows having a predetermined time length, and the number of appearing windows may be set as the number of appearances.

In a column of an "appearance ratio (%) in a video", a ratio of a time length in which a feature value of each group appears with respect to a time length of the analyzed image (moving image) is indicated.

Figure 12:
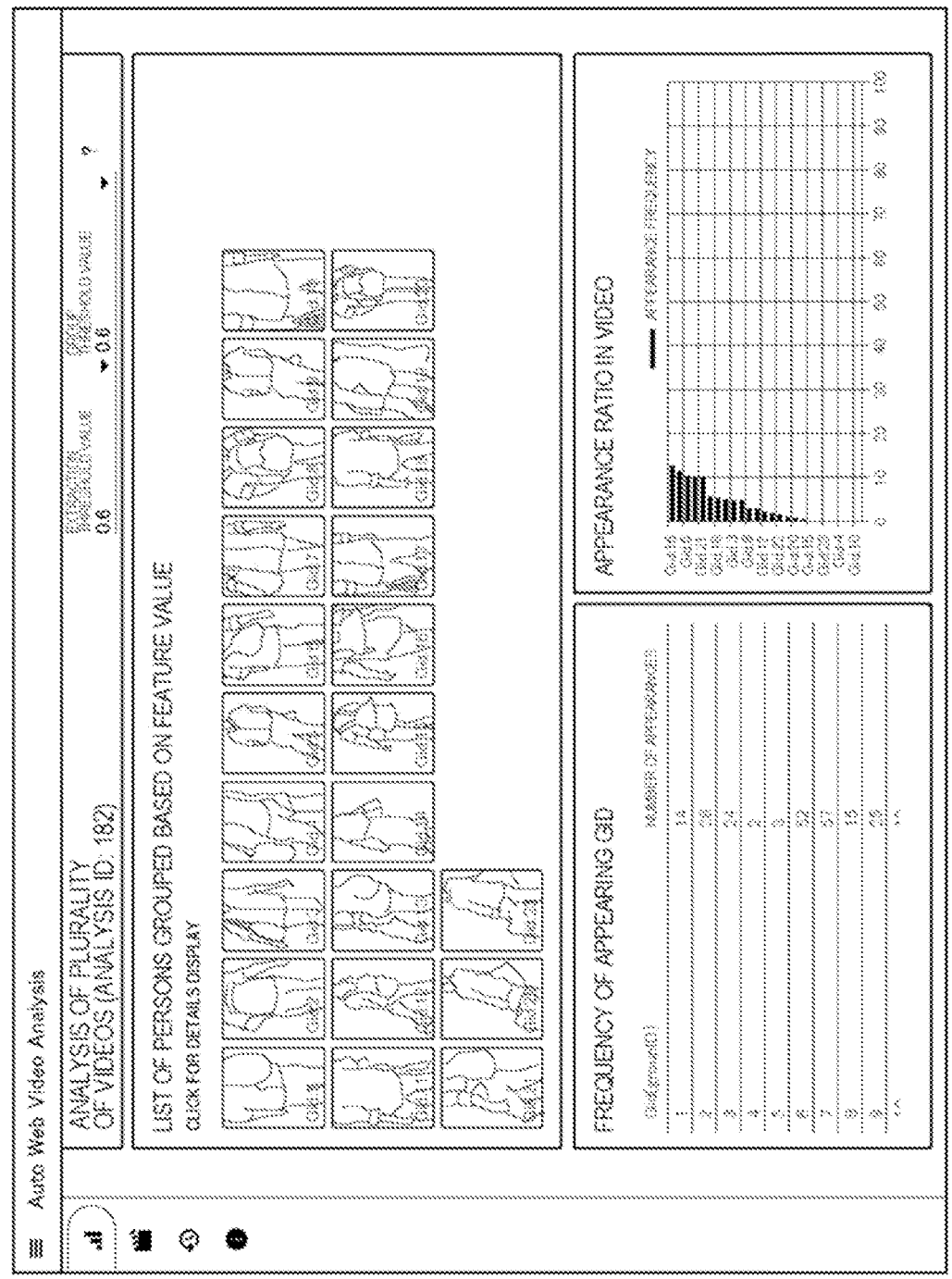
FIG. 12 is a diagram schematically illustrating one example of information output by the image analysis system according to the present example embodiment.

FIG. 12 illustrates one example of analysis result provided based on a web page.

In a column of a "list of persons grouped based on a feature value", a result of grouping feature values extracted from the analyzed image is indicated.

In a column of a "frequency of an appearing GID", the number of appearances of a feature value of each group in the analyzed image is indicated. For example, a moving image is divided into a plurality of windows having a predetermined time length, and the number of appearing windows may be set as the number of appearances.

In a column of an "appearance ratio (%) in a video", a ratio of a time length in which a feature value of each group appears with respect to a time length of the analyzed image (moving image) is indicated.

Figure 13:
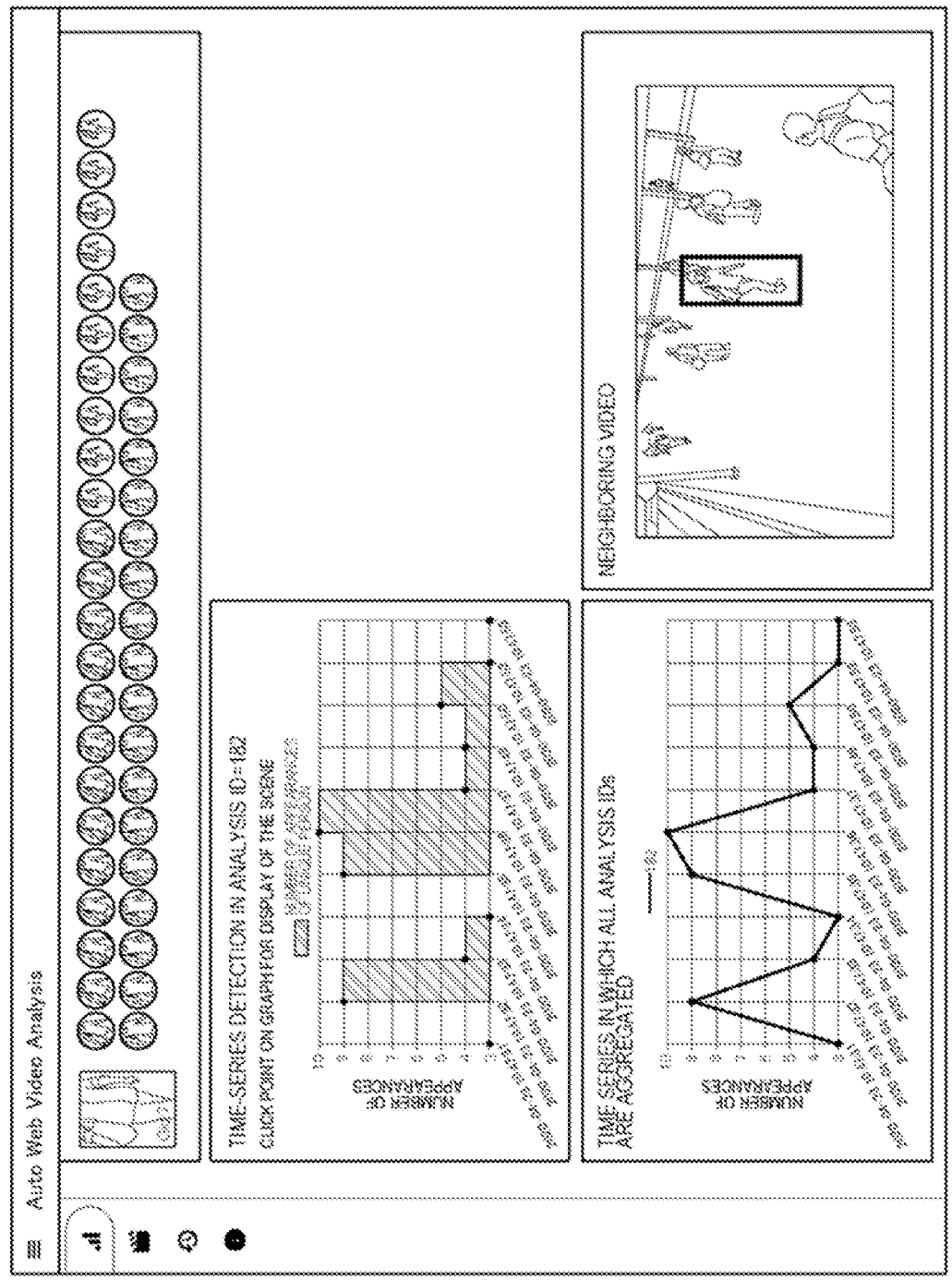
FIG. 13 is a diagram schematically illustrating one example of information output by the image analysis system according to the present example embodiment.

FIG. 13 illustrates one example of an analysis result provided based on a web page. For example, in the web page in FIG. 12, according to an operation for selecting one group (any one of Gids 1 to 23), a screen illustrated in FIG. 13 is displayed.

In an upper portion of the screen, a representative thumbnail image of a selected group and a plurality of other thumbnail images are indicated.

In a column of "time-series detection in analysis ID=182", a temporal change in the number of appearances of a feature value of the selected group in one analyzed image (one moving image) is indicated.

Figure 14:
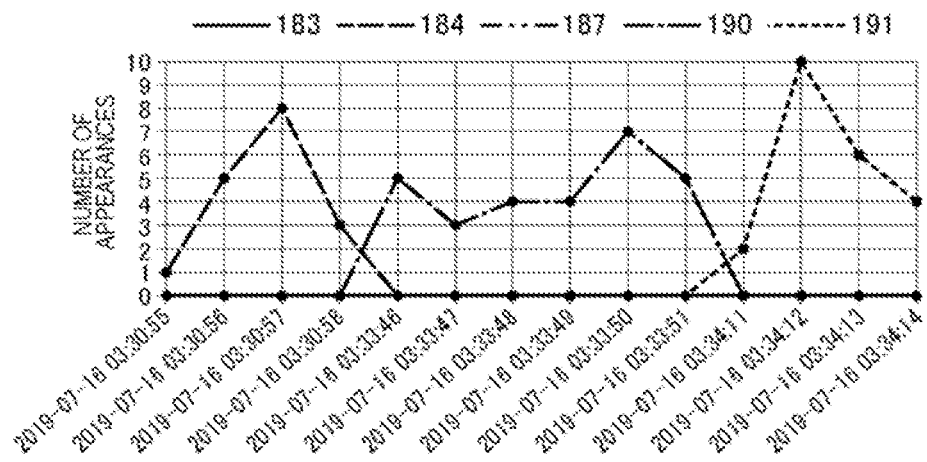
FIG. 14 is a diagram schematically illustrating one example of information output by the image analysis system according to the present example embodiment.

In a column of a "time-series in which all analysis IDs are aggregated", a temporal change in the number of appearances of a feature value of the selected group in each of a plurality of analyzed images (a plurality of analyzed moving images) is indicated. Note that, in the figure, only an analysis result for one image is illustrated, but when a plurality of images are analyzed, as illustrated in FIG. 14, a broken line relevant to each of a plurality of images is displayed.

Referring back to FIG. 13, in a column of a "neighboring video", one scene of the analyzed image is indicated. For example, in the column of "time-series detection in analysis ID=182" and in the column of the "time-series in which all analysis IDs are aggregated", according to an operation for selecting any date and time on a graph, reproduction from the specified date and time is started in the column of the "neighboring video".

Figure 15:
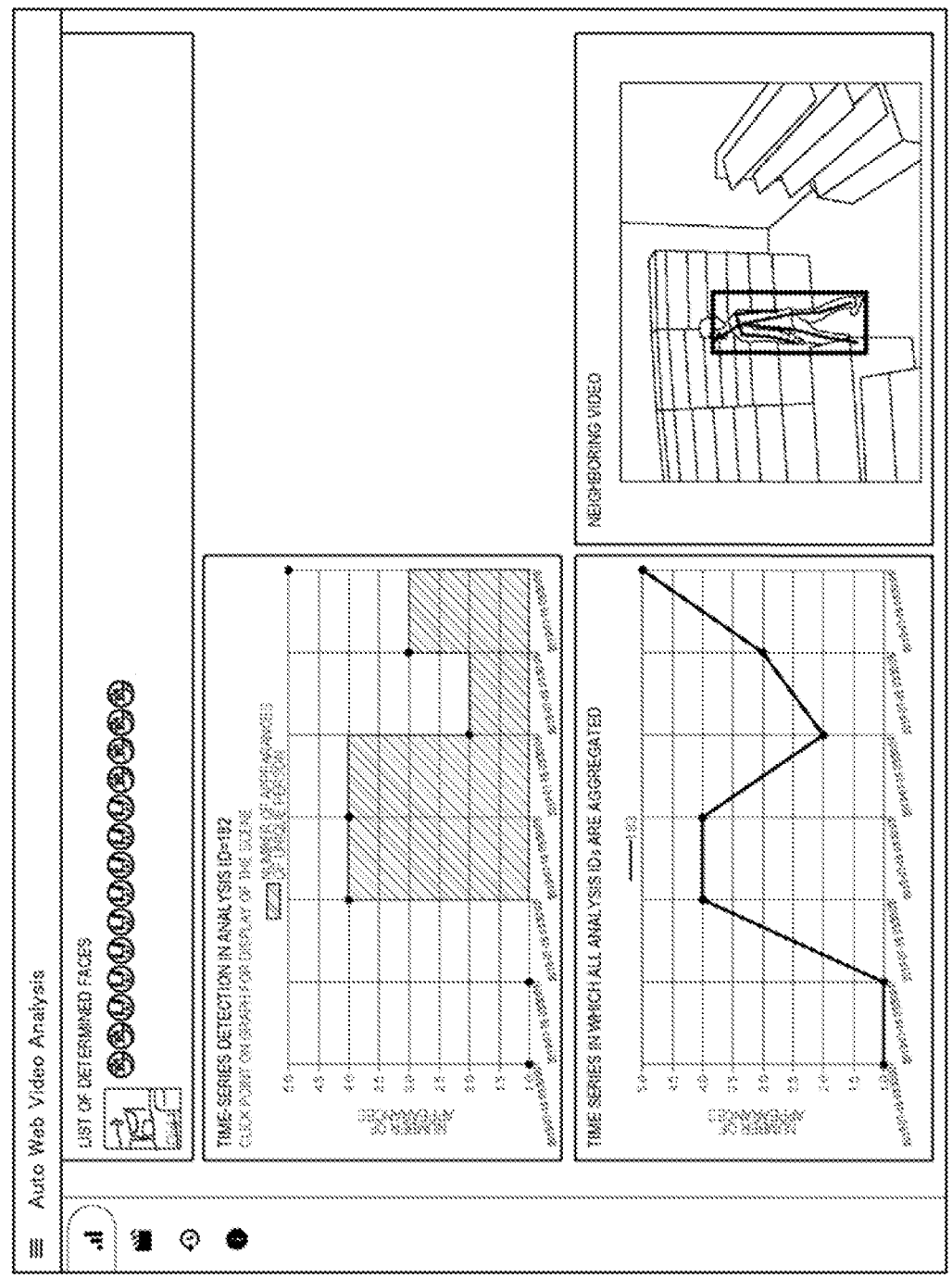
FIG. 15 is a diagram schematically illustrating one example of information output by the image analysis system according to the present example embodiment.

FIG. 15 illustrates one example of an analysis result provided based on a web page. FIG. 15 is different from FIG. 13 in a content displayed in the column of a "neighboring video". Other configurations are similar to those in FIG. 13. FIG. 15 illustrates a result of a pose analysis. In this case, as illustrated, in the column of the "neighboring video", a skeletal structure of a detected person may be indicated.

Figure 16:
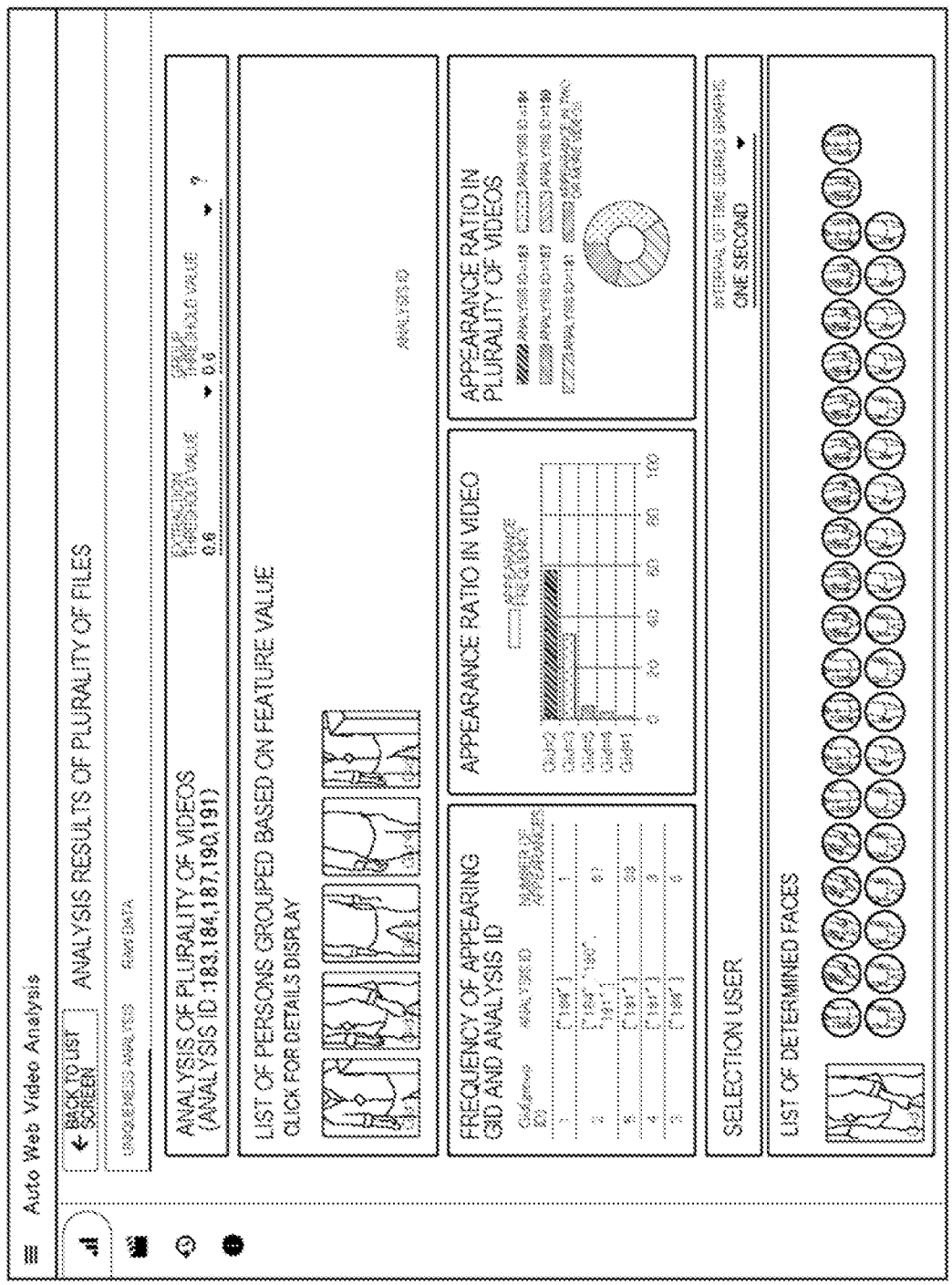
FIG. 16 is a diagram schematically illustrating one example of information output by the image analysis system according to the present example embodiment

FIG. 16 illustrates one example of an analysis result provided based on a web page. In the screen, a plurality of analysis results for a plurality of images (a plurality of moving images) are collectively displayed.

In a column of a "list of persons grouped based on a feature value", a result of grouping feature values extracted from a plurality of analyzed images (a plurality of moving images) is indicated.

In a column of a "frequency of an appearing GID and an analysis ID", the number of appearances of a feature value of each group in the entirety of a plurality of analyzed images (a plurality of analyzed moving images) is indicated. Moreover, it is indicated by what analysis ID each feature value is extracted (synonymous with "by analysis of what moving image, the extraction is executed").

In a column of an "appearance ratio (%) in a video", a ratio of a time length in which a feature value of each group appears with respect to a time length in the entirety of a plurality of analyzed images (a plurality of analyzed moving images) is indicated.

In a column of an "appearance ratio in a plurality of videos", a ratio of the number of appearances of a feature value detected in each image with respect to the number of appearances of feature values detected in the entirety of a plurality of analyzed images (a plurality of analyzed moving images) is indicated.

In a column of a "list of determined faces", a representative thumbnail image of a selected group and a plurality of other thumbnail images are indicated.

Figure 17:
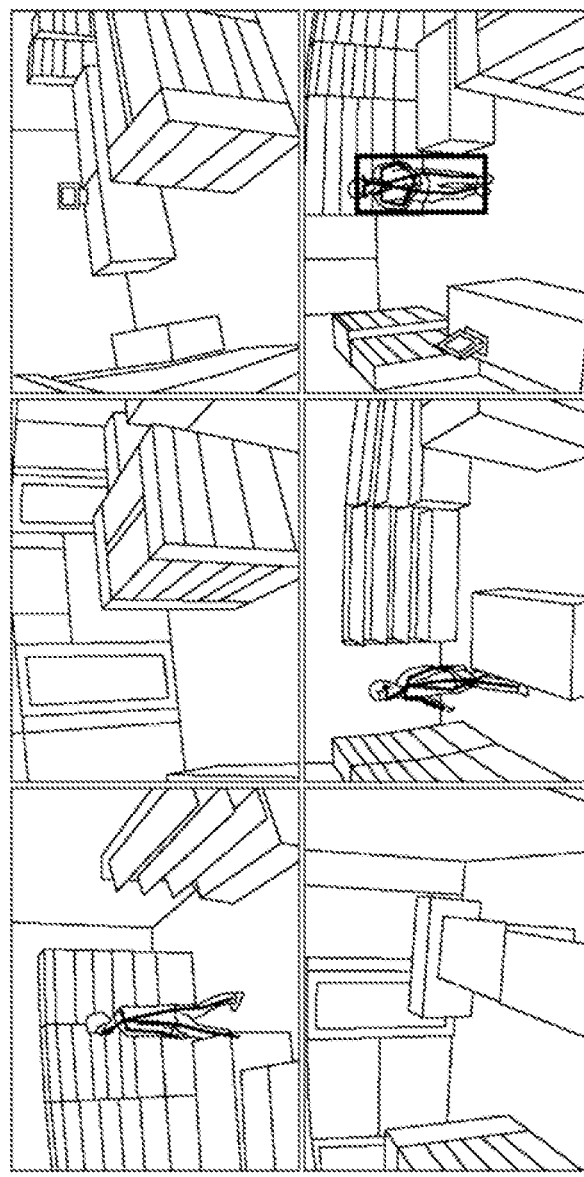
FIG. 17 is a diagram schematically illustrating one example of information output by the image analysis system according to the present example embodiment

Note that, when a plurality of results of analyses with respect to a plurality of images (a plurality of moving images) are collectively displayed, as illustrated in FIG. 17, a column in which times are synchronized and thereby, a plurality of images are reproduced and displayed may be provided. For example, in the column of the "neighboring video" in FIG. 13 or FIG. 15, such images may be displayed.

Advantageous Effects

The image analysis system 10 according to the above-described present example embodiment includes a plurality of image analysis unit for executing image analyses of different types from each other, and analyzes an image specified by a user, by using an image analysis unit selected based on user input. According to the image analysis system 10 configured in such a manner, convenience improves.

Moreover, the image analysis system 10 according to the present example embodiment can generate and output one analysis report in which results of a plurality of types of image analyses are aggregated. According to such an analysis report, a user can execute analysis while comparing results of a plurality of types of image analyses and confirming these results in parallel. As a result, information hidden in an image can be found.

Moreover, according to the image analysis system 10 of the present example embodiment, a format of an analysis report can be configured in such a way as to be capable of being customized by a user. In this case, a user can acquire an analysis report in which, for example, desired information is displayed based on a desired layout. As a result, efficiency of confirmation and analysis of an analysis report improves.

Moreover, according to the image analysis system 10 of the present example embodiment, it is possible to define a format of an analysis report for each analysis purpose, and generate and output the analysis report of a format relevant to the analysis purpose selected by a user. In this case, a user can acquire an analysis report of a format suitable for the analysis purpose. As a result, efficiency of confirmation and analysis of an analysis report improves.

Moreover, the image analysis system 10 can be configured in such a way as to be capable of increasing, based on installation of a plug-in, the number of image analysis units 11. When such a configuration is made, based on relatively-simple processing being installation of a plug-in, types of image analyses executable by the image analysis system 10 can be increased. With an increase in types of image analyses executable by the image analysis system 10, convenience improves.

Moreover, the image analysis system 10 can include a means for notifying, when an image analysis is completed, a user of this matter. In this case, a user does not necessarily need to wait until an image analysis is terminated, and can do another thing during the time period. As a result, convenience improves.

Moreover, the image analysis system 10 can include a means for outputting raw data for an image analysis. In this case, a user can uniquely process raw data or execute processing for raw data. As a result, convenience improves.

Moreover, according to the above-described wide variety of UI screens, a user and an administrator can easily recognize various types of statuses, and confirm a result of an image analysis.

The whole or part of the example embodiment disclosed above can be described as, but not limited to, the following supplementary notes.

1. An image analysis system including:
   a plurality of image analysis unit;
   a selection unit that selects at least one of a plurality of the image analysis unit;
   an analysis control unit that causes the selected image analysis unit to analyze an image specified by a user; and
   an output unit that outputs an analysis result of the image.

2. The image analysis system according to supplementary note 1, wherein
   the output unit outputs an analysis report generated based on an analysis result of the image.

3. The image analysis system according to supplementary note 2, wherein
   a format of the analysis report is defined with respect to each analysis purpose, and
   the output unit generates and outputs the analysis report, based on the format defined relevantly to the analysis purpose selected by a user.

4. The image analysis system according to supplementary note 3, wherein
   the output unit adds/modifies, based on user input, a definition of a format of the analysis report.

5. The image analysis system according to any one of supplementary notes 1 to 4, wherein
   the output unit includes a unit that notifies, when analysis of the image based on the selected image analysis unit is terminated, the user of the termination matter.

6. The image analysis system according to any one of supplementary notes 1 to 5, wherein
   the output unit outputs raw data generated based on analysis of the image.

7. The image analysis system according to any one of supplementary notes 1 to 6, wherein
   the number of the image analysis unit can be increased based on installation of a plug-in.

8. The image analysis system according to any one of supplementary notes 1 to 7, wherein
   the selection unit selects the image analysis unit selected by a user.

9. The image analysis system according to any one of supplementary notes 1 to 8, wherein
   the selection unit refers to association information associating an analysis purpose with at least the one image analysis unit, and selects at least the one image analysis unit associated with the analysis purpose selected by a user.

10. An image analysis method including,
    by a computer:
    selecting at least one of a plurality of image analysis unit;
    causing the selected image analysis unit to analyze an image specified by a user; and
    outputting an analysis result of the image.

REFERENCE SIGNS LIST

10 Image analysis system
11 Image analysis unit
12 Selection unit
13 Image specification unit
14 Input unit
15 Analysis control unit
16 Storage unit
17 Output unit
1A Processor
2A Memory
3A Input/output I/F
4A Peripheral circuit
5A Bus

What is claimed is:

1. An image analysis system comprising:
   at least one memory configured to store one or more instructions; and
   at least one processor configured to execute the one or more instructions to:
   accept, from a user, input for specifying an image and input for selecting an analysis purpose;
   refer to association information associating a plurality of analysis purposes with a plurality of types of image analysis, wherein the plurality of analysis purposes comprises a first analysis purpose associated with at least one first type of image analysis and a second analysis purpose associated with at least one second type of image analysis;
   select, among the plurality of types of image analysis, in consideration of the association information, at least one type of image analysis associated with the analysis purpose selected by the user;
   execute the selected type of image analysis to analyze an the image specified by the user; and
   output an analysis result of the image.

2. The image analysis system according to claim 1, wherein
   the at least one processor is further configured to execute the one or more instructions to output an analysis report generated based on an-the analysis result of the image.

3. The image analysis system according to claim 2, wherein
   a format of the analysis report is defined with respect to each of the plurality of analysis purposes, and
   the at least one processor is further configured to execute the one or more instructions to generate and output the analysis report, based on the format defined with respect to the analysis purpose selected by the user.

4. The image analysis system according to claim 3, wherein
   the at least one processor is further configured to execute the one or more instructions to add/modify, based on user input, a definition of a format of the analysis report.

5. The image analysis system according to claim 1, wherein
the at least one processor is further configured to execute the one or more instructions to notify, when analysis of the image based on the selected at least one type of image analysis is terminated, the user of the termination.

6. The image analysis system according to claim 1, wherein
the at least one processor is further configured to execute the one or more instructions to output raw data generated based on analysis of the image.

7. The image analysis system according to claim 1, wherein
a type of image analysis unit can be added based on installation of a plug-in.

8. The image analysis system according to claim 1, wherein
the plurality of types of image analysis comprises appearance attribute estimation, color feature detection of an image, and object recognition.

9. The image analysis system according to claim 8, wherein
the at least one processor is further configured to execute the one or more instructions to, in a case where the selected type of image analysis comprises the appearance attribute estimation,
recognize an appearance attribute of an object included in the image; and
calculate similarity related to the recognized appearance attribute.

10. The image analysis system according to claim 9, wherein
the at least one processor is further configured to execute the one or more instructions to display at least one thumbnail image related to the analysis result.

11. The image analysis system according to claim 10, wherein
the at least one processor is further configured to execute the one or more instructions to
store a plurality of images, the plurality of images being candidates for analysis target; and
display a list of the plurality of stored images on a display.

12. The image analysis system according to claim 11, wherein
the at least one processor is further configured to execute the one or more instructions to
identify an image, based on either a user operation specifying one of the plurality of stored images or a user operation inputting a new image, and
execute the selected type of image analysis to analyze the identified image.

13. An image analysis method comprising,
by a computer:
accept, from a user, input for specifying an image and input for selecting an analysis purpose;
refer to association information associating a plurality of analysis purposes with a plurality of types of image analysis, wherein the plurality of analysis purposes comprises a first analysis purpose associated with at least one first type of image analysis and a second analysis purpose associated with at least one second type of image analysis;
selecting, among the plurality of types of image analysis, in consideration of the association information, at least one type of image analysis-unit associated with the analysis purpose selected by the user;
executing the selected type of image analysis to analyze an the image specified by the user; and
outputting an analysis result of the image.

* * * * *